Patented Sept. 7, 1937

2,092,449

UNITED STATES PATENT OFFICE 2,092,449

MANUFACTURE OF CONDENSATION PRODUCTS FROM ALIPHATIC ORGANIC COMPOUNDS

Otto Fuchs, Frankfort-on-the-Main, and Wilhelm Querfurth, Mainz-Mombach, Germany No Drawing. Application March 27, 1934, Serial No. 717,679. In Great Britain October 26, 1931

12 Claims. (Cl. 260—138)

This application is a continuation in part of the application Serial No. 639,734, filed October 26th, 1932.

The present invention relates to the manufacture of valuable condensation products from the oxygenated derivatives of the paraffin series of hydrocarbons and specifically relates to the production of alcohols, esters and other valuable derivatives of higher molecular weight from propyl alcohol or from propyl alcohol in admixture with methyl, ethyl, butyl, amyl and/or hexyl alcohols by catalytic treatment in the presence of hydrogen.

The treatment may be carried out at atmospheric or at superatmospheric pressure. The different alcohol molecules of the initial mixture not only condense with each other in accordance with the law of mass action, but also the condensation takes place between like molecules.

In carrying out the manufacture according to the present invention we use catalysts which consist of a difficultly reducible oxide or mixture of oxides having only feeble or no basic action and being stable at the prevailing temperature, together with a metal or mixture of metals known to have a hydrogenating or dehydrogenating action and not exceeding in quantity ten per cent by weight of the complete catalyst. The metal or metals may be taken in their metallic state and be admixed as such or the oxide or oxides may be used, it being understood that owing to the use of hydrogen as hereinbefore mentioned and as hereinafter described the oxide or oxides will rapidly be reduced. We may also use, as an addition in the catalyst, oxides having a basic reaction, but we prefer to limit the amount of these basic oxides so that the proportion present is always less than the proportion of the other catalytic constituents. We have found, however, that when the materials to be treated contain a substantial proportion of a higher alcohol such for example as butyl alcohol, as would be the case for instance when retreating part of the products from the treatment of a lower alcohol, it is preferable to employ a catalyst containing larger amounts of the basic oxide. The catalyst may be used on carriers, such as pumice or other inert material.

According to the present invention it is essential that hydrogen should be added to the reaction mixture as it has been found that improved technical results are obtained by this addition; and moreover, the addition of hydrogen increases the activity and the life of the catalyst. Suitable amounts of hydrogen are from one half mol. hydrogen to three or more mols hydrogen for each mol. of aliphatic compound.

The conversion can be carried out at temperatures between 150 and 450° C. and atmospheric pressure may be used although we prefer to use increased pressure especially when treating reaction mixtures containing larger amounts of a higher alcohol such as butyl alcohol, in which case the use of moderate pressures up to fifty atmospheres is advantageous.

As examples of the metal oxides of feeble basic action which can be used may be mentioned alumina, uranium oxide, thoria, beryllium oxide and zirconium oxide and so forth, and as catalytic metals can be mentioned copper, nickel, silver, chromium, cadmium, zinc, tin, manganese and cobalt. Suitable oxides having a basic reaction are calcium oxide, barium oxide, strontium oxide, magnesia and lithia.

We have also found that by altering the proportions of metal oxide and catalytic metal in the catalyst, the course of the reaction can be influenced so that either higher yields of alcohols and the like can be produced, or the conversion can be directed towards the production of larger proportions of esters and so forth. It is essential, however, that the proportion of catalytic metal should not exceed ten per cent by weight of the total catalyst.

After the catalytic conversion the products of the reaction may be condensed and separated, or partially condensed and recirculated over the catalyst. The unconverted starting material may be recirculated over the catalyst alone or together with any of the products of the reaction.

As above stated, not only do the different alcohol molecules of the initial mixture condense with each other in accordance with the law of mass action, but the condensation also takes place between like molecules. Thus for instance initial mixtures which are particularly rich in propyl alcohol will yield predominating quantities of hexyl alcohol.

The following examples are illustration in a general way of the manner in which the invention may be carried into effect, and the results obtained.

Example I

The catalyst used is composed as follows:

|  | Grams |
|---|---|
| Magnesia | 438 |
| Copper oxide | 19 |
| Alumina hydroxide gel (15 per cent) | 264 |
| Iron nitrate | 11 |
| Saw dust (700 mesh per sq. cm.) | 27 |
| Phosphorous acid | 222 | with the addition of a sufficient quantity of water (ca. 900 ccm.) were well mixed together. The mass obtained was dried and broken into pieces. This catalyst was then filled into a pressure resistant tube furnished with electrical heating.

A vaporous mixture of 2,68 mol. ethyl alcohol and 2,65 mol. n-propyl alcohol together with 3,8 mol. hydrogen per hour and per liter catalyst were passed over the said catalyst at 321° C. and 28 atmospheres. The reaction mixture which was obtained consisted of:

| | Mol. per cent |
|---|---|
| Acetaldehyde (relating to the total amount of carbon used in the starting mixture) | 2.2 |
| Propionic aldehyde Ethyl alcohol Propyl alcohol | 60.3 |
| Butyl alcohol | 4.5 |
| Amyl alcohol (boiling between 123 and 140°) | 11.7 |
| Higher alcohols (heptyl alcohol octyl alcohol, etc.) | 8.2 |

The unconverted ethyl alcohol, propyl alcohol as well as the aldehydes in the reaction mixture may be recovered by distillation and returned for another process.

*Example II*

Propyl alcohol and butyl alcohol or amyl alcohol are passed over the same catalyst as in Example I and under the same reaction conditions. The reaction product obtained has a predominance of heptyl or octyl alcohols.

Instead of carrying out the operation in the vapor phase the condensation may also be carried out in the liquid phase, use being made of a diluent and the operation being effected at elevated pressure.

*Example III*

The catalyst employed was composed as follows:—

| | |
|---|---|
| Magnesium oxide | parts Mg by weight 89 |
| Alumina | parts Al by weight 8 |
| Copper oxide | parts Cu by weight 3 |

As will be observed the amount of basic oxide is considerable. This is because we are here treating a mixture of alcohols including a higher alcohol as hereinbefore mentioned. Actually the mixture consisted of methyl alcohol, butyl alcohol, and hydrogen in the proportion of 4.6 mols. methyl alcohol, 2 mols. butyl alcohol and 2 mols. hydrogen. This mixture was passed over the catalyst at a pressure of about 30 atmospheres and a temperature of 350° C.

The condensation products obtained (in addition to unchanged components and small amounts of acetaldehyde, butyraldehyde and esters of formic acid) were as follows:—

| | Parts by weight |
|---|---|
| Amyl alcohol | 1078 |
| Hexyl alcohol | 82 |
| Alcohols of higher boiling point especially heptyl alcohol | 480 |

This example shows that by using a mixture of alcohols including a higher alcohol together with methyl alcohol, the higher alcohols with a boiling point of over 120° C. can be obtained in consideratble quantities. It is, for example, possible to take the mixed products resulting from any initial conversion of a lower alcohol into a higher alcohol and retreat it according to the present invention for the further conversion into higher alcohols. Similarly it is possible to take the mixed product of any initial conversion of a lower alcohol into a higher alcohol or to take either component of such a product and to mix it with a fresh quantity of an alcohol and subject that mixture to treatment according to the present invention. In place of the butyl alcohol above mentioned propyl may be used.

We claim:—

1. The process of producing valuable condensation products from propyl alcohol which comprises subjecting said propyl alcohol in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with an alkali earth metal oxide as the preponderant constituent and the reaction temperature ranging from about 150° C. to about 450° C.

2. The process of producing valuable condensation products from propyl alcohol in admixture with normally liquid homologous alcohols which comprises subjecting said mixture of alcohols in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with an alkali earth metal oxide as the preponderant constituent and the reaction temperature ranging from about 150° C. to about 450° C.

3. The process of producing valuable condensation products from propyl alcohol in admixture with normally liquid homologous alcohols which comprises subjecting said mixture of alcohols in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin manganese and cobalt and the oxides thereof, said substance not exceeding in quantity 10% by weight of the complete catalyst and in admixture with magnesia as the preponderant constituent and the reaction temperature ranging from about 150° C. to about 450° C.

4. The process of producing valuable condensation products from propyl alcohol in admixture with normally liquid homologous alcohols which comprises subjecting said mixture of alcohols in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with barium oxide as the preponderant constituent and the reaction temperature ranging from about 150° C. to about 450° C.

5. The process of producing valuable condensation products from propyl alcohol in admixture with normally liquid homologous alcohols which comprises subjecting said mixture of alcohols in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with calcium oxide as the preponderant constituent and the reaction temperature ranging from about 150° C. to about 450° C.

6. The process of producing valuable condensation products from propyl alcohol which comprises subjecting said propyl alcohol in conjunction with hydrogen to the action of a mixed catalyst comprising essentially a dehydrating metal oxide which will be stable in the reaction in admixture with a hydrogenating metal not exceeding in quantity 10% by weight of the complete catalyst and in admixture with an alkali earth metal oxide as the preponderant constituent, the reaction temperature ranging from about 150° C. to about 450° C.

7. The process of producing valuable condensation products from propyl alcohol which comprises subjecting said propyl alcohol in conjunction with hydrogen to the action of a mixed catalyst comprising essentially a dehydrating metal oxide which will be stable in the reaction in admixture with a hydrogenating metal oxide not exceeding in quantity 10% by weight of the complete catalyst and in admixture with an alkali earth metal oxide as the preponderant constituent, the reaction temperature ranging from about 150° C. to about 450° C.

8. The process of producing valuable condensation products from propyl alcohol in admixture with normally liquid homologous alcohols which comprises subjecting said mixture of alcohols in conjunction with hydrogen to the action of a mixed catalyst comprising essentially a dehydrating metal oxide which will be stable in the reaction in admixture with a hydrogenating metal not exceeding in quantity 10% by weight of the complete catalyst and in admixture with an alkali earth metal oxide as the preponderant constituent, the reaction temperature ranging from about 150° C. to about 450° C.

9. The process of producing valuable condensation products from a mixture of normally liquid homologous alcohols containing propyl alcohol which comprises subjecting said mixture of alcohols in conjunction with hydrogen to the action of a mixed catalyst comprising essentially a dehydrating metal oxide which will be stable in the reaction in admixture with a hydrogenating metal oxide not exceeding in quantity 10% by weight of the complete catalyst and in admixture with an alkali earth metal oxide as the preponderant constituent, the reaction temperature ranging from about 150° C. to 450° C.

10. The process of producing valuable condensation products from propyl alcohol which comprises subjecting said mixture of alcohols in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with magnesia as the preponderant constituent and the reaction temperature ranging from about 150° C. to about 450° C.

11. The process of producing valuable condensation products from propyl alcohol which comprises subjecting said mixture of alcohols in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with barium oxide as the preponderant constituent and the reaction temperature ranging from about 150° C. to about 450° C.

12. The process of producing valuable condensation products from propyl alcohol which comprises subjecting said mixture of alcohols in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with calcium oxide as the preponderant constituent and the reaction temperature ranging from about 150° C. to about 450° C.

OTTO FUCHS.
WILHELM QUERFURTH.